United States Patent
Narayanan

(10) Patent No.: US 12,129,191 B1
(45) Date of Patent: Oct. 29, 2024

(54) AUTONOMOUS SYSTEM AND METHOD FOR MONITORING AND IMPROVING WATER QUALITY BY MITIGATING HARMFUL ALGAL BLOOMS

(71) Applicant: Nishant Narayanan, Palatine, IL (US)

(72) Inventor: Nishant Narayanan, Palatine, IL (US)

( * ) Notice: Subject to any disclaimer, the term of this patent is extended or adjusted under 35 U.S.C. 154(b) by 0 days.

(21) Appl. No.: 18/779,609

(22) Filed: Jul. 22, 2024

Related U.S. Application Data

(60) Provisional application No. 63/515,484, filed on Jul. 25, 2023.

(51) Int. Cl.

| | | |
|---|---|---|
| G06V 30/148 | (2022.01) | |
| C02F 1/50 | (2023.01) | |
| G06F 3/02 | (2006.01) | |
| G06F 7/24 | (2006.01) | |
| G06F 18/20 | (2023.01) | |
| G06F 18/213 | (2023.01) | |
| G06V 10/82 | (2022.01) | |
| G06V 20/56 | (2022.01) | |
| G06V 20/62 | (2022.01) | |
| G06V 20/69 | (2022.01) | |
| C02F 103/00 | (2006.01) | |

(52) U.S. Cl.
CPC ............... *C02F 1/50* (2013.01); *G06V 10/82* (2022.01); *G06V 20/56* (2022.01); *G06V 20/69* (2022.01); *C02F 2103/007* (2013.01); *C02F 2201/008* (2013.01); *C02F 2209/006* (2013.01); *G06V 2201/07* (2022.01)

(58) Field of Classification Search
CPC ............... C02F 1/50; C02F 2103/007; C02F 2201/008; C02F 2209/006; G06V 10/82; G06V 20/69; G06V 20/56; G06V 2201/07
See application file for complete search history.

(56) References Cited

FOREIGN PATENT DOCUMENTS

| CN | 110940314 A | * | 3/2020 | ........... G01N 21/643 |
| CN | 113011397 A | * | 6/2021 | ........... G06F 18/241 |
| CN | 112550704 B | * | 12/2022 | ............. H04L 67/52 |

* cited by examiner

*Primary Examiner* — David F Dunphy
(74) *Attorney, Agent, or Firm* — Novel Patent Services

(57) ABSTRACT

A system for monitoring and improving water quality by mitigating harmful algal blooms. The system comprises an automatic detection unit that is configured to affix to an unmanned vehicle (UV). The automatic detection unit is adapted to detect harmful algal blooms in a water body when the UV flies over it. The automatic detection unit communicates to a server via a network. This automated process ensures swift identification without human intervention, enhancing efficiency. The system performs real-time data transmission that allows for analysis and response, facilitating timely decisions and interventions to mitigate algal blooms. The system is integrated with an artificial intelligence module, trained on reference data using convolution neural networks (CNNs). By automating detection, analysis, and response processes, the system optimizes operational efficiency, reducing manual effort and response times in managing algal bloom incidents.

20 Claims, 8 Drawing Sheets

AUTONOMOUS SYSTEM AND METHOD FOR MONITORING AND IMPROVING WATER QUALITY BY MITIGATING HARMFUL ALGAL BLOOMS

The present disclosure relates generally to environmental monitoring and management systems, and more particularly to an autonomous system for detecting and mitigating harmful algal blooms (HABs) using an artificial intelligence (AI) deep learning model.

BACKGROUND

Harmful Algal Blooms (HABs) are increasingly invading our water body, posing significant threats to ecosystems, drinking water supplies, and public health. Driven by climate change, these blooms are becoming more frequent and severe, causing widespread disruptions and alarming consequences.

HABs occur when algae, often microscopic in size, proliferate rapidly, producing toxins that can be detrimental to humans, animals, and the environment. The combination of warmer water temperatures, increased nutrient runoff from agriculture, and stagnant water conditions creates the perfect storm for these blooms to flourish. The impacts of HABs are profound and far-reaching, affecting not just local ecosystems but also the economy and public health on a national and global scale.

One of the most concerning aspects of HABs is their threat to human health. Toxins produced by certain algae can cause a range of severe health issues, including Paralytic Shellfish Poisoning (PSP), Neurotoxic Shellfish Poisoning (NSP), Diarrhetic Shellfish Poisoning (DSP), Amnesic Shellfish Poisoning (ASP), respiratory problems, skin irritation, neurological disorders, digestive distress, and liver damage. These health risks are particularly acute when people consume contaminated water or seafood, or even come into contact with water affected by HABs. Water contaminated with bacteria, viruses, or parasites can cause a variety of waterborne diseases, such as diarrhea, vomiting, cramps, and even more serious illnesses.

The economic ramifications of HABs are staggering. In the United States alone, all fifty states have reported instances of HABs, leading to substantial financial losses. Some of the notable impacts include fish kills, increased drinking water costs, business losses, and declining real estate prices. At present, municipalities have seen drinking water treatment costs rise by 5% to 10% as they struggle to remove algal toxins from water supplies. Companies reliant on clean water have reported losses totaling $1 billion due to HAB-related disruptions. Properties near affected water body have seen their values plummet by up to 25%, reflecting the diminished quality of life and environmental health.

Despite the severity of the problem, current approaches to detecting and mitigating HABs are labor-intensive and costly. Water specialists and environmental engineers often spend months treating even small lakes at high cost. This manual, reactive approach is not sustainable given the increasing frequency and scale of HABs.

Therefore, there is a need for a holistic, autonomous system that can efficiently detect and mitigate HABs. There is a need for an autonomous system that utilizes advanced technologies for real-time monitoring, and automated dispensing mechanisms to provide proactive and cost-effective solutions.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a system for monitoring and improving water quality by mitigating harmful algal blooms. The system comprises an automatic detection unit that is configured to securely affix to an unmanned vehicle (UV). The automatic detection unit is adapted to automatically detect harmful algal blooms in a water body when the UV flies over the water body. The automatic detection unit is configured to communicate to a server via a network.

The automatic detection unit comprises a housing, at least one capturing unit, an artificial intelligence module, at least one chamber, and a controller. The housing is configured to be affixed to a body of the UV and adapted to withstand various weather conditions.

The capturing unit is configured to capture one or more images or videos of the water body upon activation of the automatic detection unit. The capturing unit comprises, but is not limited to, multispectral cameras, hyperspectral cameras, and artificial Intelligence (AI) cameras.

The artificial intelligence module is configured to receive and analyze the images or videos of the water body from the capturing unit, and detect the harmful algal blooms in the water body in real time through a deep learning model using convolution neural networks (CNNs). The artificial intelligence module is trained using reference data as training data to detect the harmful algal blooms from the captured images or videos, thereby accurately detecting the harmful algal blooms.

The chamber is defined by the housing, configured to store an algaecide material, which is dispensed into the water body upon detection of the harmful algal blooms through the artificial intelligence module. The chamber has a lid, which is automatically operable through an actuator, thereby facilitating to dispense the algaecide material from the chamber into the water body.

The controller is disposed within the housing, configured to activate and control the capturing unit for continuous capturing of the images or videos of the water body in real-time. The controller is further configured to transmit the captured images or videos to the server via the network in real time. The controller is further configured to actuate the actuator to automatically open and close the lid of the chamber for dispensing the algaecide material upon detection of the harmful algal blooms in the water body.

In one embodiment, the actuator is operatively connected to a rotatable arm. The rotatable arm is configured to rotate to move the lid of the chamber, thereby facilitating to dispense the algaecide material from the chamber into the water body.

In one embodiment, the network includes a communication protocol that comprises at least one of Bluetooth, wireless local area network (WLAN), transmission control protocol/internet protocol (TCP/IP), wireless fidelity (Wi-Fi), global system for mobile communications (GSM), code division multiple access (CDMA), or a combination of both wireless and wired technologies.

In one embodiment, the server comprises an artificial intelligence (AI) deep learning model, wherein the AI deep learning model is trained using reference data as training data to detect the harmful algal blooms from the captured images or videos, thereby accurately detecting the harmful algal blooms. The training data comprises a variety of high resolution pictures of different types of algae, a variety of clean water images, and random objects.

In one embodiment, each user device is configured to enable a user to access data related to at least one of live image feeds, prediction statuses, and mitigation actions received from the automatic detection unit in real time through a user interface via a software application installed on the user device. The software application comprises at least one of a web application and a mobile application.

The user interface is configured to display the real-time images or videos received from the automatic detection unit. The user interface is configured to receive and display the data related to at least one of live image feeds, prediction statuses, and mitigation actions from the server. The user interface is configured to indicate the dispensing process of the algaecide material.

An embodiment of the first aspect wherein a method is disclosed for detecting and mitigating harmful algal blooms (HABs) in water body. The method comprises activating and controlling, by the controller, the capturing unit for continuous capturing of the images or videos of water body in real-time as the UV traverses over the water body. The method comprises transmitting, by the controller, the captured images or videos to the artificial intelligence module, and the server via the network in real time. The method comprises, analyzing, by the artificial intelligence module, the captured real-time images or videos for detecting the harmful algal blooms.

The method comprises actuating, by the controller, the actuator to automatically open and close the lid of the chamber for dispensing the algaecide material upon detection of the harmful algal blooms in the water body. The method comprises transmitting, by the controller, data related to the real-time images or videos, and real-time status update data to one or more user device through the server via the network.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
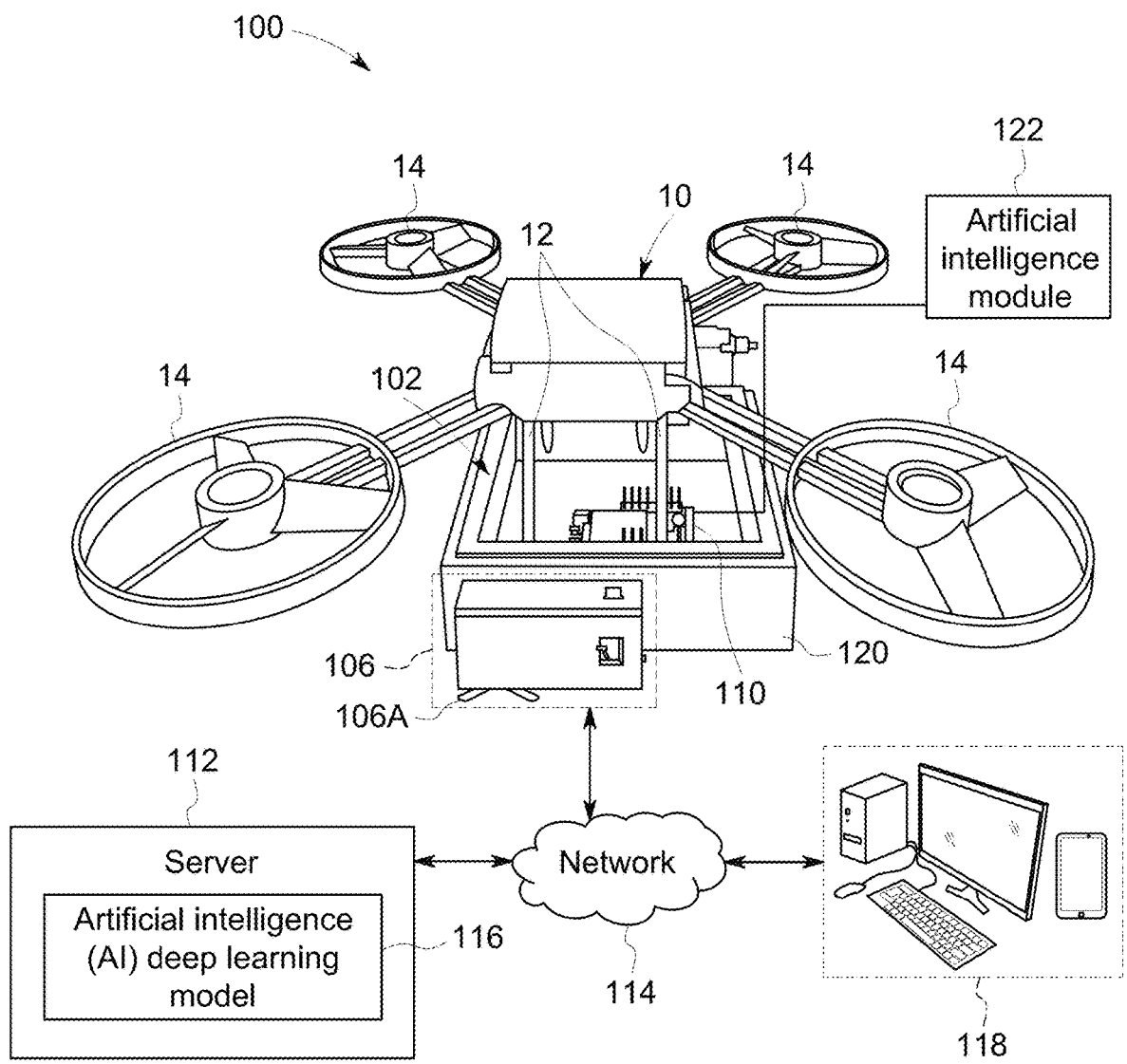
FIG. 1A illustrates a block diagram of an autonomous system for detecting and mitigating harmful algal blooms (HABs) on a water body, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1A refers to a block diagram of an autonomous system 100 for detecting and mitigating harmful algal blooms (HABs) on a water body. The system 100 comprises an automatic detection unit 102 that is configured to securely affix to an unmanned vehicle (UV) 10. The automatic detection unit 102 is adapted to automatically detect harmful algal blooms in the water body when the UV 10 flies over the water body. This automated process ensures swift identification without human intervention, enhancing efficiency. The automatic detection unit 102 is configured to communicate to a server 112 via a network 114. Further, the automatic detection unit 102 is in communication with one or more user devices 118 through the server 112 via the network 114.

In one embodiment, the automatic detection unit 102 comprises a housing 120, an actuator 106, at least one capturing unit 108, a controller 110, and an artificial intelligence module 122.

The housing 120 is configured to be affixed to a body 16 of the UV 10 and adapted to withstand various weather conditions. In one embodiment, the housing 120 is designed as a water-resistant and weather-resistant, ensuring the protection of its contents from various environmental conditions. The housing 120 is constructed from a durable material that can withstand exposure to moisture, rain, and other adverse weather conditions. This makes the housing 120 ideal for use in outdoor and challenging environments, providing secure storage and transportation for an algaecide material.

In another embodiment, the housing 120 is made of a material that comprises, but is not limited to, high-density polyethylene (HDPE), polycarbonate, acrylonitrile butadiene styrene (ABS), fiberglass-reinforced plastic (FRP), stainless steel, aluminum alloys, thermoplastic polyurethane (TPU), and thereof. The choice of material likely includes properties such as high tensile strength, UV resistance, and resistance to temperature fluctuations, ensuring the housing 120 remains robust and reliable in diverse climates.

In another embodiment, the housing 120 is securely attached to the body 16 of the UV 10 by means of an attachment assembly. The attachment assembly consists of one or more support shafts 12, which provide structural support and stability to the housing 120. The support shafts are likely designed to withstand the forces encountered during flight, ensuring that the housing 120 remains firmly in place.

In addition to the support shafts 12, the attachment assembly includes one or more fasteners (not shown). These fasteners are essential for locking the support shafts 12 and the housing 120 in position, preventing any unwanted movement or detachment during operation. The fasteners could be bolts, screws, clamps, or other types of locking mechanisms that can endure the dynamic conditions of flight. Together, the support shafts 12 and fasteners work to securely integrate the housing 120 with the UV 10, ensuring that it can carry out its intended function without risk of detachment or instability.

In another embodiment herein, the UV 10 is an unmanned aerial vehicle (UAV). The UAV is equipped with at least four propellers 14, positioned at each of the four corners. Each propeller's speed and direction of rotation are independently controlled, allowing for precise balancing and movement of the UV 10. To maintain stability, one pair of propellers 14 rotates clockwise while the other pair rotates counterclockwise. This counter-rotation helps to counteract the torque effects, ensuring the UV 10 remains balanced. To achieve vertical movement, such as hovering, all propellers 14 increase their speed uniformly. By adjusting the speed of individual propellers 14, the UV 10 can be maneuvered forward, backward, and side-to-side, providing versatile control for various flight operations.

In some embodiments, the UV 10 comprises at least one of, but not limited to, unmanned aerial vehicles (UAVs), unmanned underwater vehicles (UUVs), water unmanned vehicles, and unmanned surface vehicles (USVs). For example, the UV 10 includes aerial drones, underwater drones, and drones.

Figure 1B:
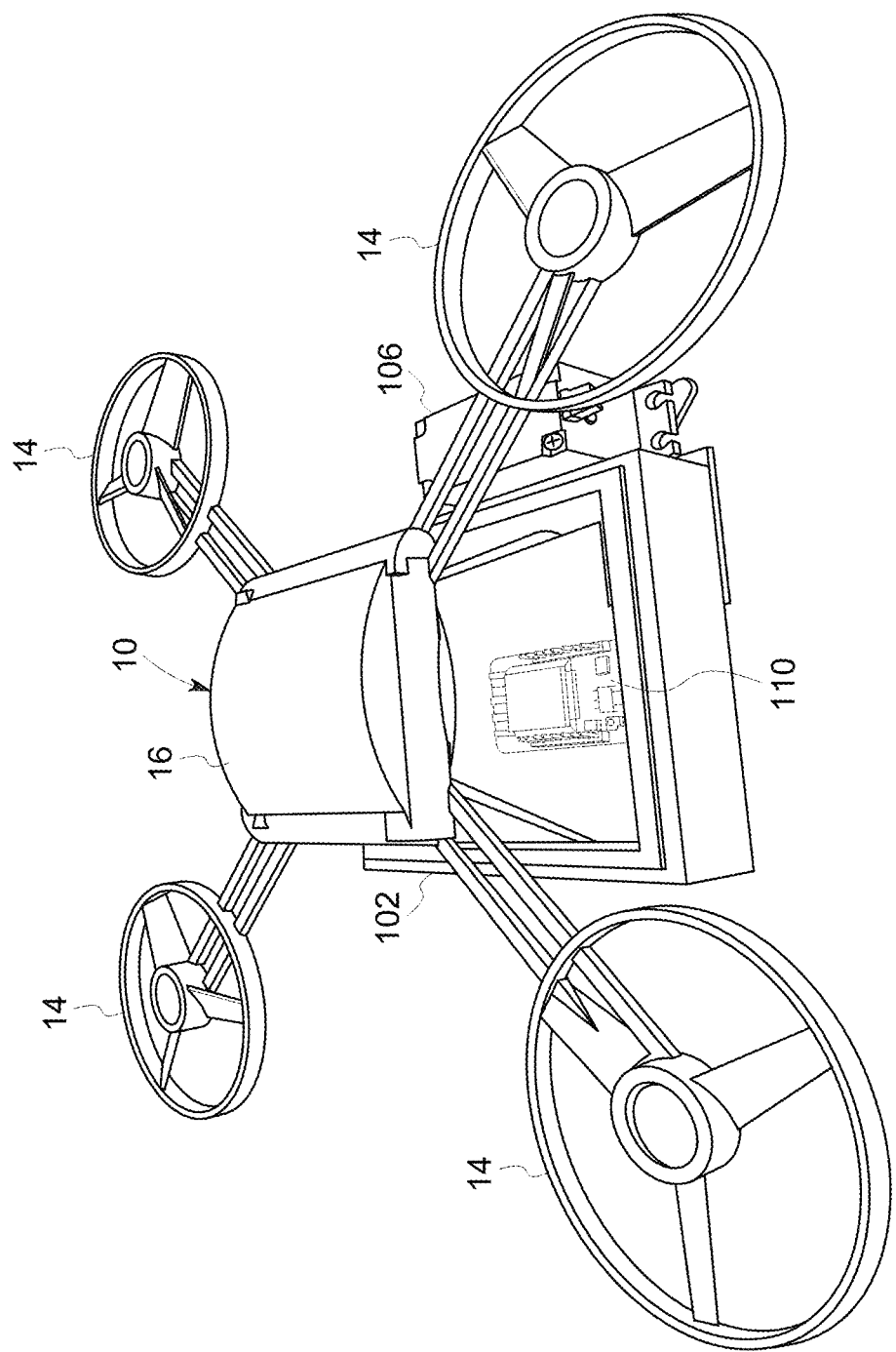
FIG. 1B illustrates a perspective top view of an automatic detection unit attached to an unmanned vehicle (UV), in accordance with embodiments of the invention.
Figure 1C:
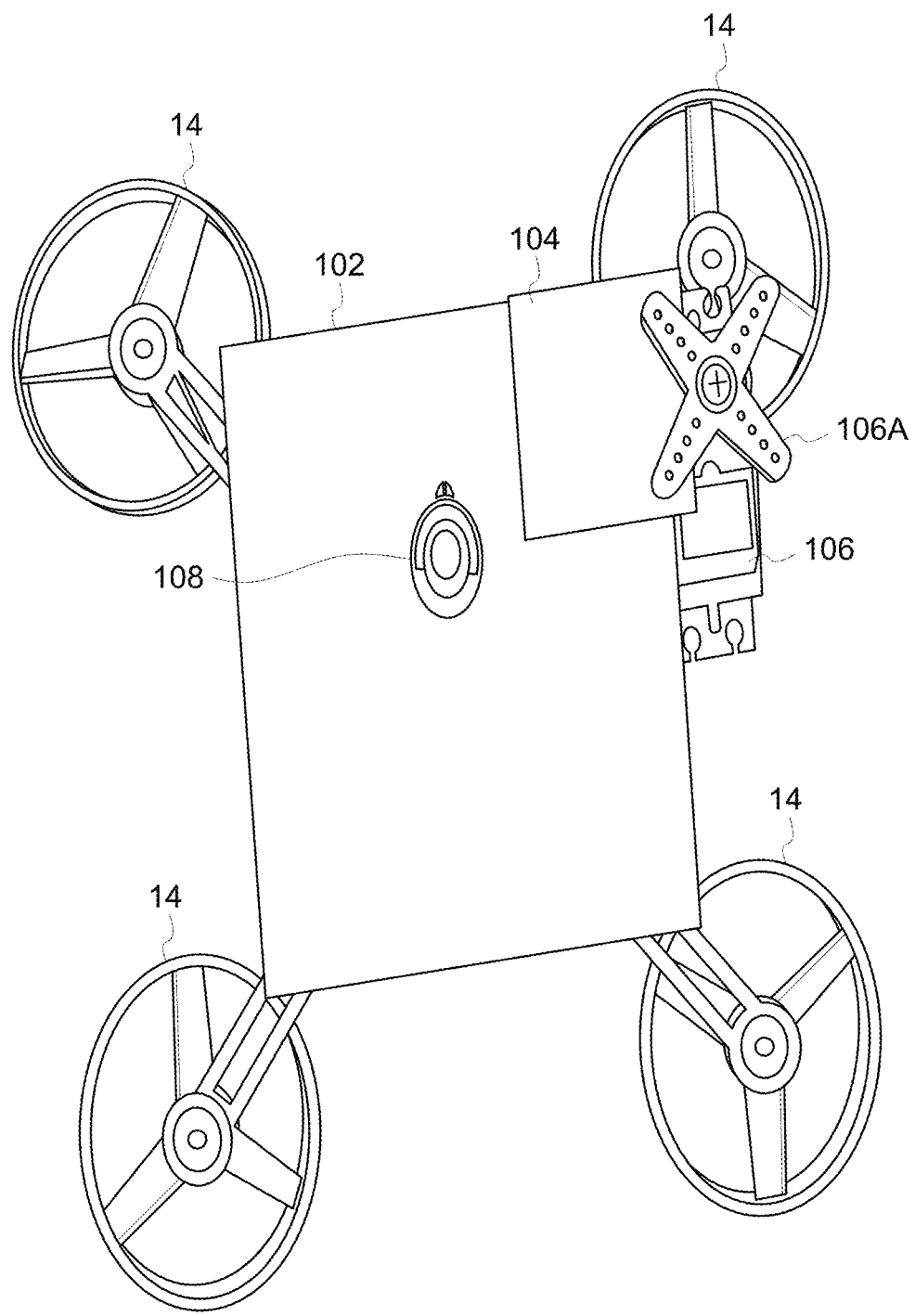
FIG. 1C illustrates a perspective bottom view of the automatic detection unit with a lid in a close position, in accordance with embodiments of the invention.
Figure 1D:
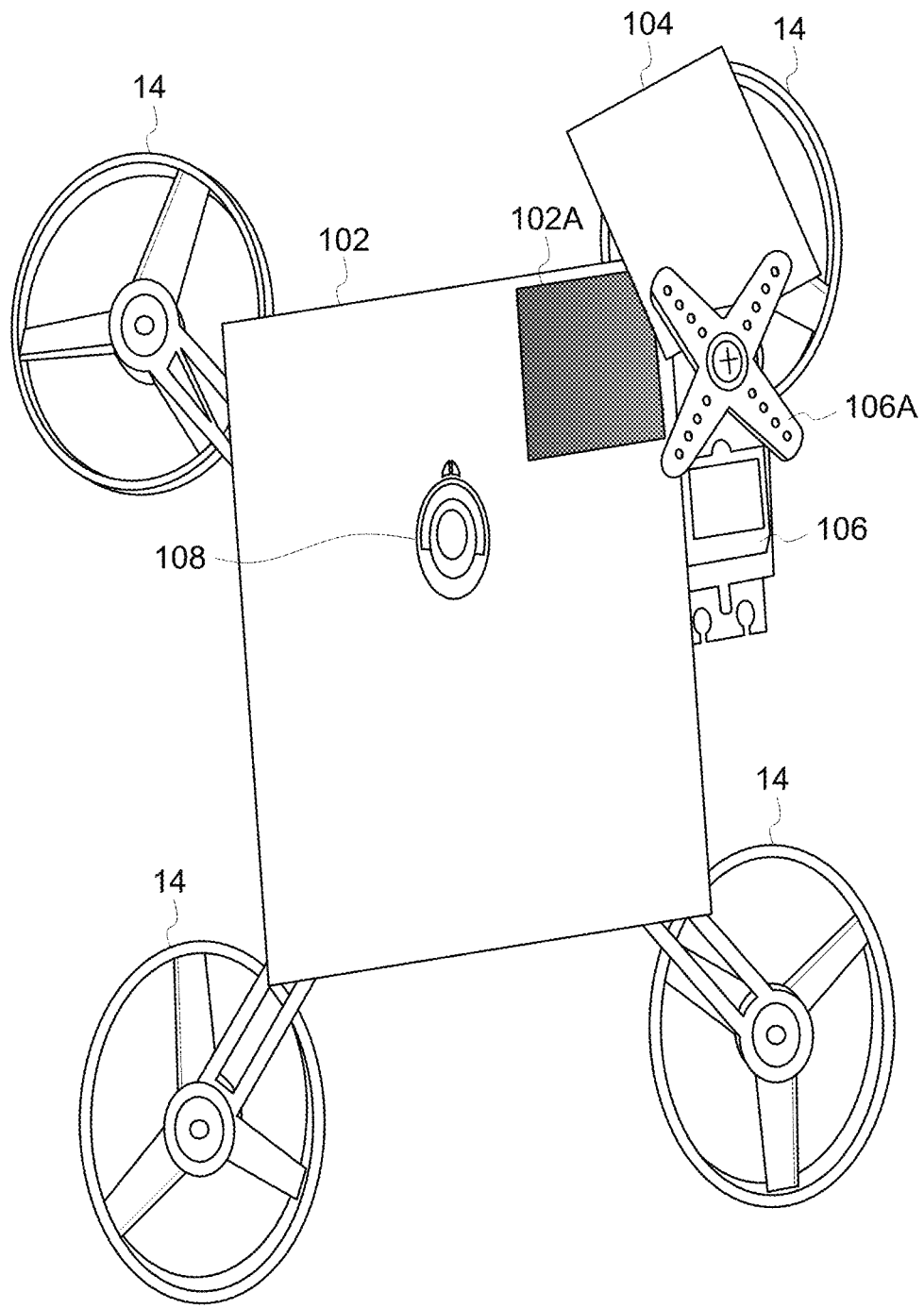
FIG. 1D illustrates a perspective bottom view of the automatic detection unit with the lid in an open position, in accordance with embodiments of the invention.

FIG. 1B refers to a perspective top view of the automatic detection unit 102 attached to the UV 10. FIG. 1C refers to a perspective bottom view of the automatic detection unit 102 with a lid 104 in a close position. FIG. 1D refers to a perspective bottom view of the automatic detection unit 102 with the lid 104 in an open position. In one embodiment, the housing 120 is mounted on the UV.

In one embodiment, at least one chamber 102A is defined by the housing 120. The chamber 102A is configured to store the algaecide material, which is dispensed into the water body upon detection of the harmful algal blooms through the artificial intelligence module 122. The chamber 102A has a lid 104, which is automatically operable through the actuator 106, thereby facilitating to dispense the algaecide material from the chamber 102A into the water body.

In another embodiment, the housing 120 may defines multiple chambers. This configuration allows for the storage of various mitigation materials beyond just algaecide. Each chamber can be filled with a specific type of material targeted towards different HAB species or environmental conditions. This versatility enables a more nuanced approach to HAB management based on the specific needs of the water body.

In some embodiments, the artificial intelligence module 122 continuously monitors the water body for detecting the presence of harmful algal blooms. Upon detection of a harmful algal bloom, the artificial intelligence module 122 analyzes the specific type of harmful algal blooms species or environmental conditions present. Based on this analysis, the artificial intelligence module 122 triggers an appropriate actuator linked to a lid of a specific chamber. The actuator then automatically opens the lid, facilitating the controlled release of the appropriate mitigation material from the chamber directly into the water body.

Figure 1E:
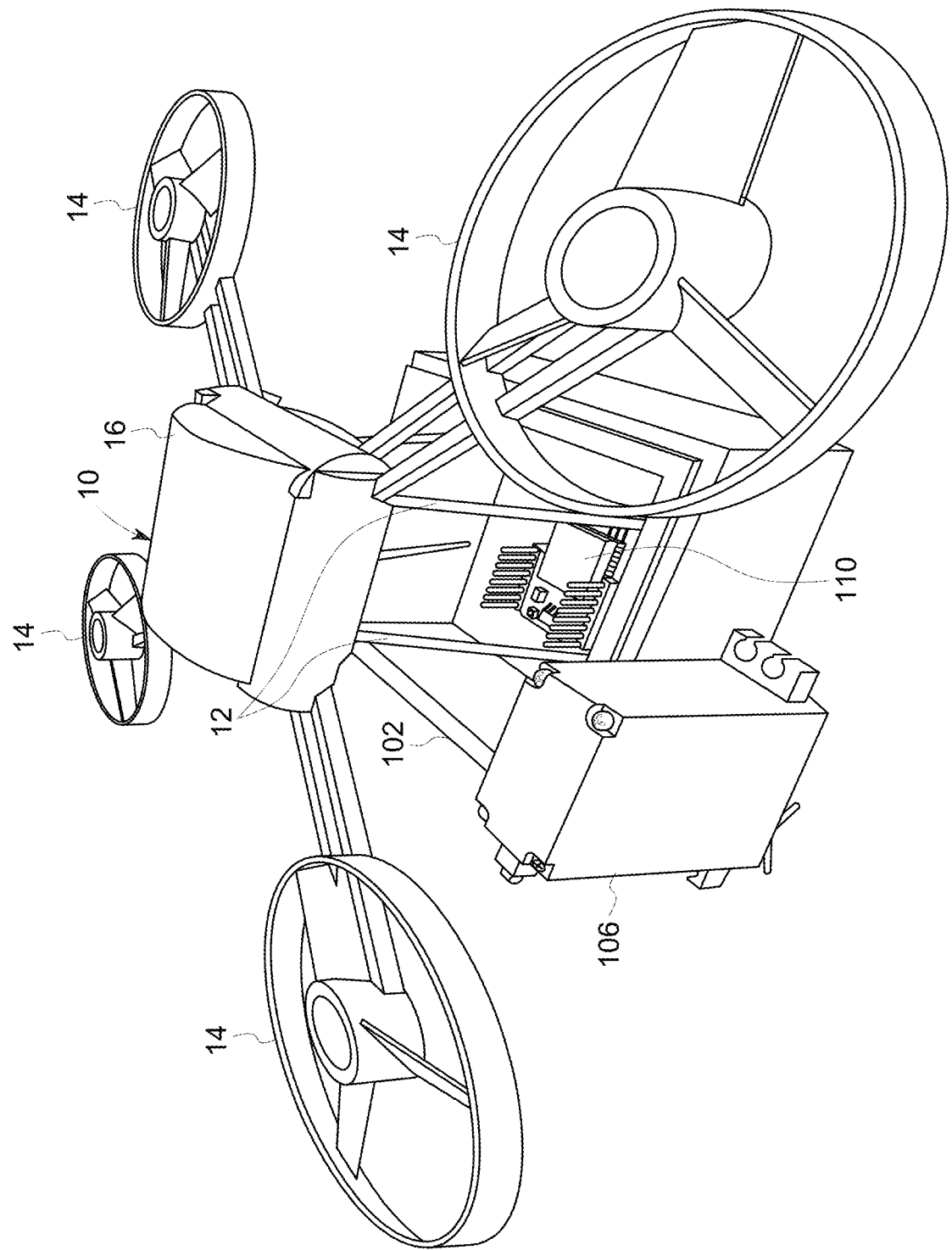
FIG. 1E illustrates another perspective view of the automatic detection unit attached to an unmanned vehicle (UV), in accordance with embodiments of the invention.

FIG. 1E refers to a perspective view of the automatic detection unit 102 attached to the UV 10. In one embodiment, the actuator 106 is operatively connected to the lid 104 of the chamber 102A. The actuator 106 is configured to move the lid 104 from the close position to the open position for dispensing the algaecide material.

In one embodiment, the actuator 106 is operatively connected to a rotatable arm 106. The rotatable arm 106 is configured to rotate to move the lid 104 of the chamber 102A, thereby facilitating to dispense the algaecide material from the chamber 102A into the water body. The actuator 106 is operatively connected to the controller 110. The rotatable arm 106A is operatively attached to the actuator 106 and the lid 104 of the chamber 102A. The rotatable arm 106A is configured to rotate the lid 104 of chamber 102A unlocking and locking the housing 120. The actuator 106 comprises, but is not limited to, a DC motor, a servo motor, a stepper motor, a linear actuator, and thereof.

In an exemplary embodiment, when the controller 110 detects the presence of harmful algal blooms in the water body, a signal triggers the actuator 106. The signal is configured to enable the power source to activate the actuator 106. The actuator 106 is mechanically interconnected with the rotatable arm 106A, causing the actuator 106 and the rotatable arm 106A to rotate in a clockwise direction.

As the actuator 106 rotates, the actuator 106 imparts motion to the rotatable arm 106A. The rotatable arm 106A, in turn, is engaged with the lid 104 of the chamber 102A. Consequently, as the rotatable arm 106A moves, the lid 104 is opened by rotating in the same direction of the rotatable arm 106A. The opening of the lid 104 facilitates the dispensing process of the algaecide material, stored within chamber 102A, directly into the water body. This mechanism ensures that upon detection of harmful algal blooms, the system promptly initiates the release of algaecide, thereby addressing the issue effectively. The dispensing process is continued till either the chamber 102A is emptied or the controller 110 detects absence of harmful algal blooms in the water body.

In one embodiment, the capturing unit 108 is mounted on to the bottom surface of the housing 120. The capturing unit 108 is configured to capture one or more images or videos of the water body when the UV 10 traverses over the water body, upon activation of the automatic detection unit 102. The capturing unit 108 comprises, but is not limited to, multispectral cameras, hyperspectral cameras, and artificial intelligence (AI) cameras.

The artificial intelligence module 122 is configured to receive and analyze the images or videos of the water body from the capturing unit, and detect the harmful algal blooms in the water body in real time through a deep learning model using convolution neural networks (CNNs). The artificial intelligence module 122 is trained using reference data as training data to detect the harmful algal blooms from the captured images or videos, thereby accurately detecting the harmful algal blooms. The training data comprises a variety of high resolution pictures of different types of algae, a variety of clean water images, and random objects.

In one embodiment, the controller 110 is disposed within the housing 120. The controller 110 is fixed on a motherboard equipped with one or more components that serves as the central processing unit for the system 100. In a preferred embodiment herein, the automatic detection unit 102 utilizes ESP32 CAM module as the controller 110. The ESP32 CAM module is integrated with the capturing unit 108. The ESP32 CAM module is an advanced microcontroller specifically designed for applications that involve the artificial intelligence module 122. The ESP32 CAM module possesses the necessary processing power and capabilities to handle tasks like image capture and pre-processing before transmitting data to the server 112 for further analysis by the AI deep learning model 116.

In another preferred embodiment, the controller 110 is comprises, but is not limited to, ESP32 CAM, NVIDIA Jetson, Raspberry Pi, Arduino Nano 33 BLE Sense, Google Coral Dev Board, and other motherboard attached to an external controlling unit i.e. an external hyperspectral camera.

The automatic detection unit 100 comprises at least one power source (not shown) to supply electric power for performing operations. The connection between the controller 110 and the power source is established through a TTL (Transistor-Transistor Logic) connector, which ensures reliable and efficient power delivery. A cable links the controller 110 to the TTL connector, facilitating the flow of electricity from the power source to the controller 110.

In some embodiments, the power source comprises, but is not limited to, an on-board rechargeable battery, and a modular battery. The modular battery is selectively removable from the automatic detection unit 102 and is configured to be charged at a location remote from the automatic detection unit 102. The automatic detection unit 102 is selectively powered by at least one of the modular battery and the on-board battery. The on-board rechargeable battery is charged from an external power source.

In some embodiment, when the power source experiences low power levels, an alert is promptly transmitted to remote operators via the user devices 118. This alert notifies them of the battery's low charge status, ensuring timely awareness and allowing for necessary actions to be taken, such as recharging or replacing the battery. This proactive notification system aids maintaining operational efficiency and prevents unexpected downtime due to depleted power supplies.

In some embodiments, the power source comprises, but not limited to, solar panels. The solar panels are either integrated or attached on an exterior surface of the housing 120 or separate solar panels positioned strategically near the housing 120. These solar panels are configured to capture sunlight and generates electrical power, which is transmitted through a cable to power the automatic detection unit 102. In some embodiments, the power source could be one or more batteries or rechargeable batteries.

Additionally, the controller 110 is responsible for controlling the actuator 106. When activated by the controller 110, the actuator 106 rotates the lid 104 to dispense the algaecide material into water body. In one embodiment, the controller 110 powers the actuator 106, which in turn rotates the rotatable arm 106A. The rotatable arm 106A is mechanically engaged with the lid 104, causing the lid 104 to rotate from the closed position to the open position. This rotation causes the housing 120 to open from the bottom, which allows the algaecide material to be released from the chamber 102A as needed. The precise control provided by the controller 110 ensures accurate and efficient dispensing of the material, optimizing the effectiveness of the system 100.

The controller's precise control over the actuator 106 ensures accurate and timely operation, enhancing the overall functionality and reliability of the system 100.

The controller 110 is operatively connected to the capturing unit 108 and the actuator 106. The controller 110 is configured to activate and control the capturing unit 108 for continuous capturing of the images or videos of the water body in real-time.

The controller 110 is configured to transmit the captured images or videos to the server 112 via the network 114, and the artificial intelligence module 122. This allows for immediate analysis and response, facilitating timely decisions and interventions to mitigate algal blooms. The controller 110 is configured to receive data related to the presence of harmful algal blooms in the water body from the artificial intelligence module 122. The controller 110 is configured to activate the actuator 106 to automatically open and close the lid 104 of the chamber 102A for dispensing the algaecide material upon detection of the harmful algal blooms in the water body. This ensures rapid deployment of mitigation measures, effectively reducing the impact of blooms on water quality. The controller 110 is further configured to transmit data related to the real-time images or videos, and real-time status update data to one or more user devices 118 through the server 112 via the network 114.

In one embodiment, the network 114 includes a communication protocol that comprises at least one of Bluetooth, wireless local area network 114 (WLAN), transmission control protocol/internet protocol (TCP/IP), wireless fidelity (Wi-Fi), global system for mobile communications (GSM), code division multiple access (CDMA), or a combination of both wireless and wired technologies.

In one embodiment, the server 112 comprises an artificial intelligence (AI) deep learning model 116. The AI deep learning model 116 is trained using reference data as training data to detect the harmful algal blooms from the captured images or videos, thereby accurately detecting the harmful algal blooms. The training data comprises a variety of high resolution pictures of different types of algae, a variety of clean water images, and random objects.

In one embodiment, the AI deep learning model 116 is trained through several static and live algae and non-algae data sets over multiple learnings. The AI deep learning model 116 is configured to process the real-time images or videos using convolutional neural network to generate the data related to at least one of live image feeds, prediction statuses, and mitigation actions.

In one embodiment, each user device 118 is configured to enable a user to access data related to at least one of live image feeds, prediction statuses, and mitigation actions received from the automatic detection unit 102 in real time through a user interface via a software application installed on the user device 118. The software application comprises at least one of a web application and a mobile application The user interface is configured to display the real-time images or videos received from the automatic detection unit 102. The user interface is configured to receive and display the data related to at least one of live image feeds, prediction statuses, and mitigation actions from the server 112. The user interface is configured to indicate the dispensing process of the algaecide material.

Figure 2A:
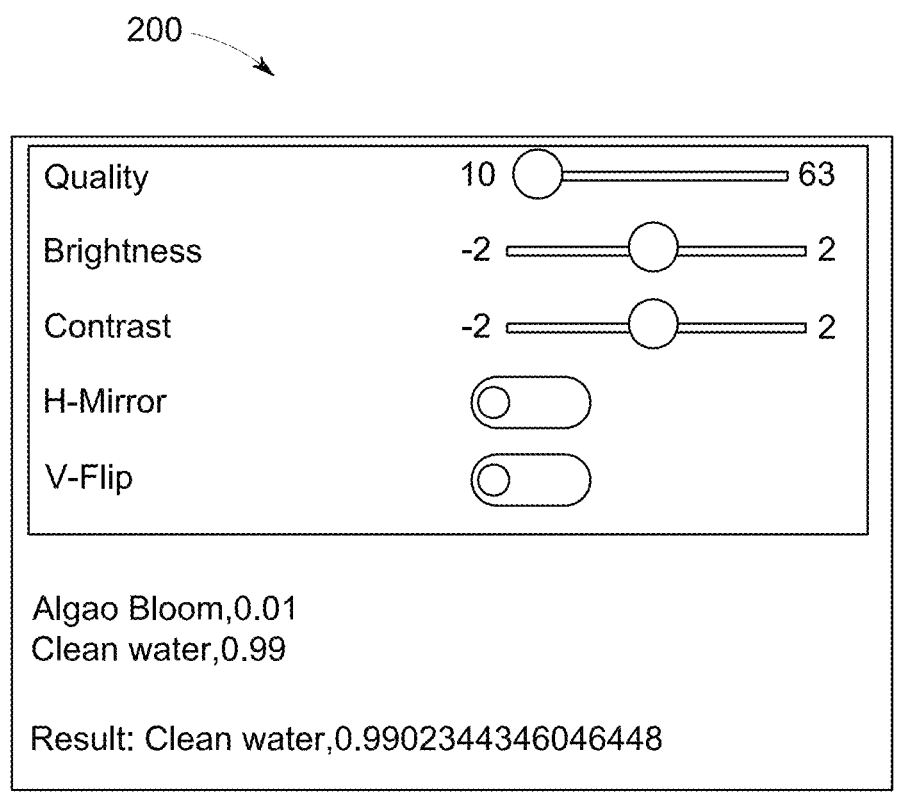
FIGS. 2A to 2B illustrate exemplary dashboards of a software application for accessing data from the automatic detection unit, in accordance with embodiments of the invention.
Figure 2B:
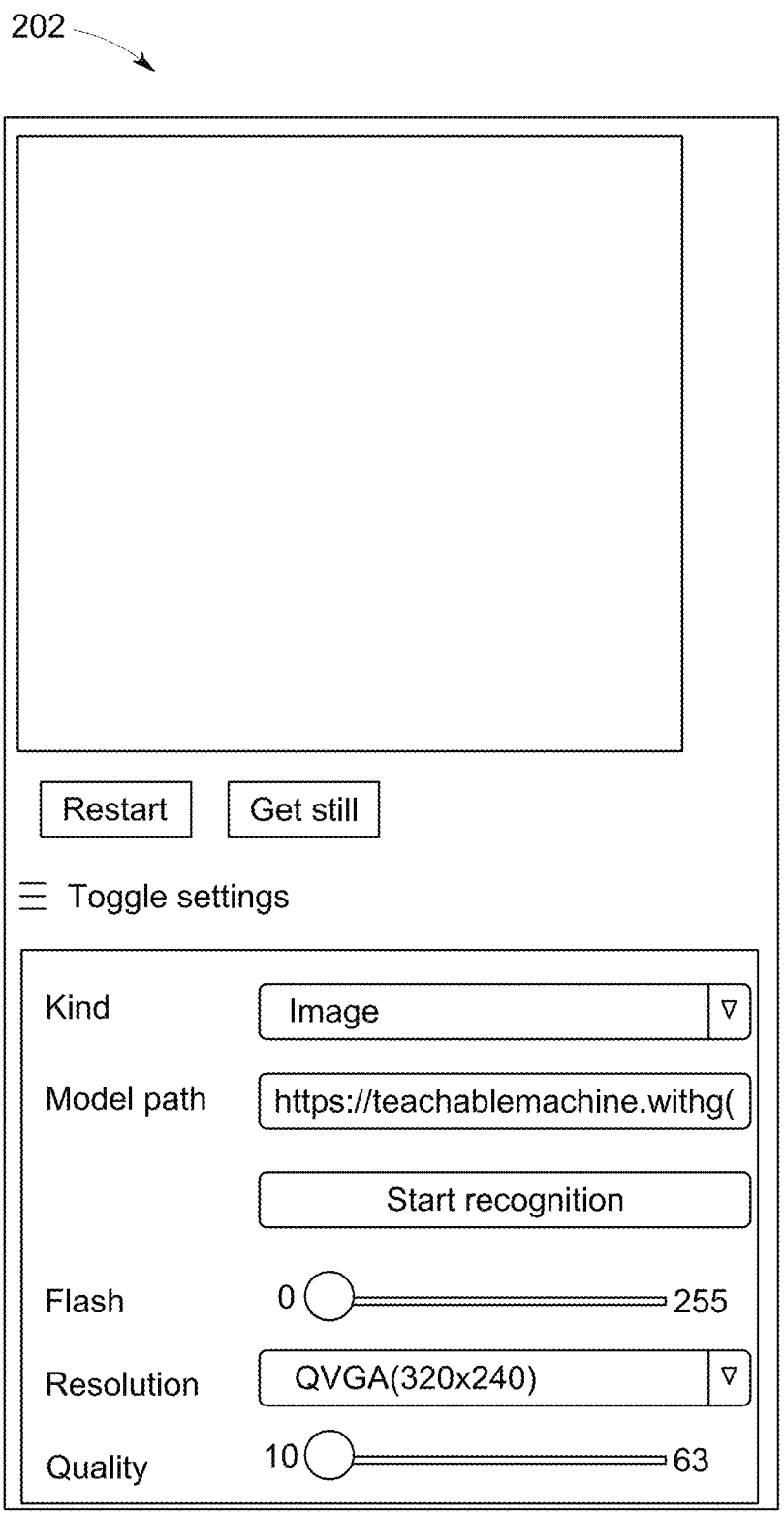

FIG. 2A refers to an exemplary dashboard 200 of the software application for accessing the data related to at least one of live image feeds, prediction statuses, and mitigation actions received from the automatic detection unit 102 in real time. FIG. 2B refers to another exemplary dashboard 202 of the software application. In one embodiment, the user devices 118 comprise, but is not limited to, computers, laptops, smart phones, smart watches, and other electronic devices. The user devices 118 are configured to the user interface to access the real-time status update data. The software application comprises at least one of a web application and a mobile application.

In one embodiment, the web application includes a web dashboard, which can be accessed by the user devices 118. The web dashboard provides users with an intuitive interface to monitor and control various aspects of the system 100. It displays real-time data, analytics, and system status, allowing users to make informed decisions and manage the system 100 efficiently.

In one embodiment, the mobile application features a mobile dashboard that is seamlessly integrated with the user devices 118. The mobile dashboard offers a similar range of functionalities as the web dashboard, but is optimized for mobile use, providing a responsive and user-friendly experience on smartphones and tablets. The integration of the mobile application with the user devices 118 ensures that users can access the system's features and information on-the-go, maintaining connectivity and control regardless of their location.

Both the web and mobile dashboards are designed to provide comprehensive access to system data, configuration settings, and operational controls, ensuring users to effectively manage and monitor the system 100 from any device. The web and mobile dashboards display easy-to-understand visualizations of real-time algae bloom risk levels in the water body, mitigation actions, and cleanness level of the water body.

The user is allows to adjust the brightness of the live image feeds or the images received from the server 112. The web and mobile dashboards are configured to display data related to at least one of live image feeds, prediction statuses, mitigation actions, and cleanness level of the water body. The user interface configured to allow user configuration of an AI deep learning URL. The AI deep learning URL refers to the web address (URL) where the AI deep learning model 116 is located. By default, the automatic detection unit 102 might use a specific model hosted on the server 112.

The user interface allows users to input the AI deep learning URL of their preferred AI deep learning model 116. This allows the users to select a model trained on a specific type of algae relevant to their location or needs. If developers release a more advanced model, the users can easily update the URL to leverage the new model's capabilities without changing the hardware of the automatic detection unit 102. Organizations or researchers might have their own trained models they want to use with the automatic detection unit 102.

In some embodiments, operators and users can access real-time data, live image feeds, prediction statuses, and mitigation actions via user devices 118 connected through the server 112. This accessibility allows for informed decision-making and monitoring remotely.

In one embodiment, both the web and mobile dashboards are remotely accessible over the network 114. The web and mobile dashboards are loaded onto the controller 110, allowing users to remotely initiate the automatic detection unit 102 to start capturing algae images and datasets. The dashboards provide functionality for configuring the AI deep learning model 116 used for predictions, enabling users to select and adjust model parameters as needed.

The controller 110 is capable of utilizing the AI deep learning model 116 as configured through the dashboards. Within the dashboards, there is a result window that displays predictions regarding the water quality, indicating whether the water is clean or contaminated with algae. If the model predicts a high probability of algae contamination, the result window also provides information about dispensing algaecide materials.

This comprehensive remote access and control capability ensures that users can effectively monitor and manage the system 100, initiate data capture, and view prediction statues, all from the convenience of their web or mobile devices.

In some embodiments, the AI deep learning model 116 within the server 112 can be continually trained and updated with new data, improving its detection accuracy over time and adapting to changing environmental conditions.

In another embodiment, the AI deep learning model 116 can be implemented as a computer-implemented method on the server 112 for tasks requiring high processing power and real-time analysis. The controller 110 of the automatic detection unit 102 transmits real-time images to the AI deep learning model 116 via the network 114. The AI deep learning model 116 processes these images, along with algae datasets captured by the capturing unit 108, to ascertain the presence of algae contamination in the water body.

In another embodiment, the system 100 also incorporates a user-friendly mobile application and a web application that allow authorized users to conveniently monitor the health of the water body and stay informed about potential algae blooms. The mobile application is downloaded and installed on various user devices 118, such as smartphones and tablets. The mobile application and the web application are designed to securely connect with the server 112 and retrieve relevant data on algae bloom detection and analysis. Based on the analysis performed by the AI deep learning model 116, the mobile application and the web application display easy-to-understand visualizations of real-time algae bloom risk levels in the water body, live image feeds, prediction statuses, mitigation actions, and cleanness level of the water body. This information empowers users to be aware of potential threats and take necessary precautions.

Upon detection of a high probability of algae contamination, the AI deep learning model 116 communicates its prediction status back to the controller 110. In response, the controller 110 issues command signals to the actuator 106. These signals instruct the actuator 106 to rotate the lid 104 by 90°, thereby opening it to dispense the algaecide material. This automated process ensures precise and timely mitigation of algae contamination based on real-time analytical data.

In one embodiment, the AI deep learning model 116, and the artificial intelligence module 122 are configured to detect the harmful algal blooms in the water body in real time through a deep learning model using convolution neural networks (CNNs), enhances the accuracy of detecting harmful algal blooms. This sophisticated AI technology improves detection capabilities over traditional methods.

Figure 3:
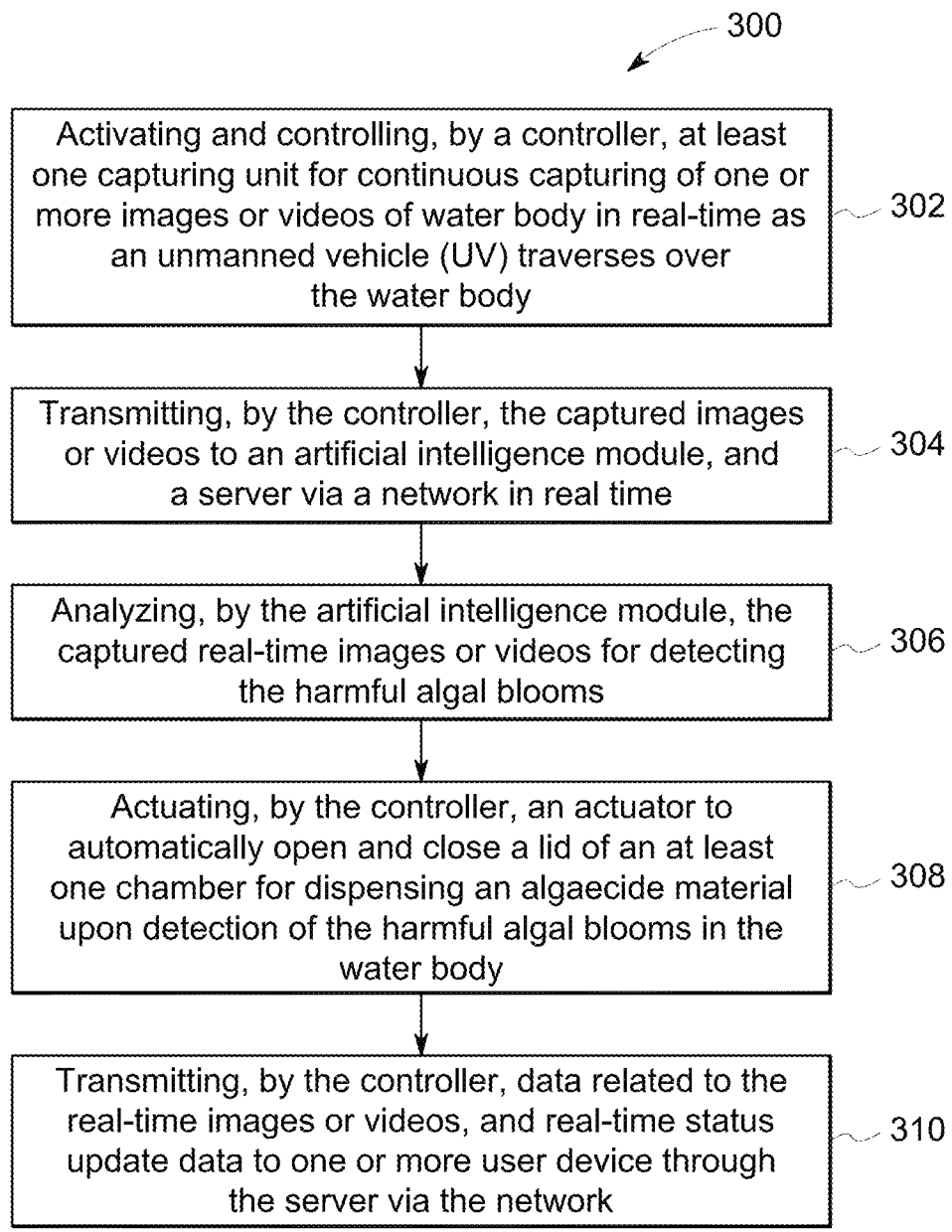
FIG. 3 illustrates a flowchart of a method for detecting and mitigating harmful algal blooms (HABs) in water body, in accordance with embodiments of the invention.

FIG. 3 refers to a flowchart 300 of a method for detecting and mitigating harmful algal blooms (HABs) in water body. The method comprises activating and controlling, by the controller 110, the capturing unit 108 continuous real-time images or videos of water body as the UV 10 traverses over the water body, as depicted in step 302.

The method comprises, transmitting, by the controller 110, the captured images or videos to the server 112 via the network 114, and the artificial intelligence module 122, as depicted in step 304. The method comprises, analyzing, by the artificial intelligence module 122, the captured real-time images or videos to detect the presence of harmful algal blooms, as depicted in step 306.

The method comprises, actuating, by the controller 110, the actuator 106 to automatically open and close the lid 104 of the chamber 102A for dispensing the algaecide material upon detection of the harmful algal blooms in the water body, as depicted in step 308. The method comprises, transmitting, by the controller 110, data related to the real-time images or videos, and the real-time status update data to the user devices 118 through the server 112 via the network 114, as depicted in step 310.

In one embodiment, by automating detection, analysis, and response processes, the system 100 optimizes resource allocation and operational efficiency, reducing manual effort and response times in managing algal bloom incidents.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A system for monitoring and improving water quality by mitigating harmful algal blooms, comprising:
   an automatic detection unit configured to securely affix to an unmanned vehicle (UV), wherein the automatic detection unit is adapted to automatically detect harmful algal blooms in a water body when the UV flies over the water body,
   wherein the automatic detection unit is configured to communicate to a server via a network,
   wherein the automatic detection unit comprises:
   a housing configured to be affixed to a body of the UV and adapted to withstand various weather conditions;
   at least one capturing unit configured to capture one or more images or videos of the water body upon activation of the automatic detection unit;
   an artificial intelligence module configured to receive and analyze the one or more images or videos of the water body from the capturing unit, and detect the harmful algal blooms in the water body in real time through a deep learning model using convolution neural networks (CNNs);
   at least one chamber defined by the housing, wherein the at least one chamber is configured to store an algaecide material, which is dispensed into the water body upon detection of the harmful algal blooms through the artificial intelligence module,
   wherein the at least one chamber having a lid, which is automatically operable through an actuator, thereby facilitating to dispense the algaecide material from the at least one chamber into the water body;
   a controller disposed within the housing, wherein the controller is configured to perform multiple operation include:
   activating and control the at least one capturing unit for continuous capturing of the one or more images or videos of the water body in real-time;
   transmitting the captured images or videos to the server via the network in real time; and
   actuating the actuator to automatically open and close the lid of the at least one chamber for dispensing the algaecide material upon detection of the harmful algal blooms in the water body.

2. The system for monitoring and improving water quality by mitigating harmful algal blooms of claim 1, wherein the artificial intelligence module is trained using reference data as training data to detect the harmful algal blooms from the captured images or videos, thereby accurately detecting the harmful algal blooms.

3. The system for monitoring and improving water quality by mitigating harmful algal blooms of claim 1, wherein the at least one capturing unit comprises at least one of multispectral cameras, hyperspectral cameras and artificial Intelligence (AI) cameras.

4. The system for monitoring and improving water quality by mitigating harmful algal blooms of claim 1, wherein the server comprises an artificial intelligence (AI) deep learning model, wherein the AI deep learning model is trained using reference data as training data to detect the harmful algal blooms from the captured images or videos, thereby accurately detecting the harmful algal blooms.

5. The system for monitoring and improving water quality by mitigating harmful algal blooms of claim 4, wherein the training data comprises a variety of high resolution pictures of different types of algae, a variety of clean water images, and random objects.

6. The system for monitoring and improving water quality by mitigating harmful algal blooms of claim 1, wherein the automatic detection unit comprises at least one power source to supply electric power for performing the multiple operations.

7. The system for monitoring and improving water quality by mitigating harmful algal blooms of claim 1, wherein the actuator is operatively connected to a rotatable arm, wherein the rotatable arm is configured to rotate to move the lid of the at least one chamber, thereby facilitating to dispense the algaecide material from the at least one chamber into the water body.

8. The system for monitoring and improving water quality by mitigating harmful algal blooms of claim 1, wherein the automatic detection unit is in communication with one or more user devices through the server via the network.

9. The system for monitoring and improving water quality by mitigating harmful algal blooms of claim 8, wherein the each user device is configured to enable a user to access data related to at least one of live image feeds, prediction statuses, and mitigation actions received from the automatic detection unit in real time through a user interface via a software application installed on the user device, wherein the software application comprises at least one of a web application and a mobile application.

10. The system for monitoring and improving water quality by mitigating harmful algal blooms of claim 9, wherein the user interface of the each user device is configured to:
   display the real-time images or videos received from the automatic detection unit;
   receive and display the data related to at least one of live image feeds, prediction statuses, and mitigation actions from the server; and
   indicate dispensing process of the algaecide material.

11. The system for monitoring and improving water quality by mitigating harmful algal blooms of claim 1, wherein the network includes a communication protocol comprises at least one of Bluetooth, wireless local area network (WLAN), transmission control protocol/internet protocol (TCP/IP), wireless fidelity (Wi-Fi), global system for mobile communications (GSM), code division multiple access (CDMA), or a combination of both wireless and wired technologies.

12. A method for or monitoring and improving water quality by mitigating harmful algal blooms using a system, comprising:
- activating and controlling, by a controller of an automatic detection unit, at least one capturing unit for continuous capturing of one or more images or videos of water body in real-time as an unmanned vehicle (UV) traverses over the water body;
- transmitting, by the controller, the captured images or videos to an artificial intelligence module of the automatic detection unit, and a server via a network in real time;
- analyzing, by the artificial intelligence module, the captured real-time images or videos for detecting the harmful algal blooms;
- actuating, by the controller, an actuator to automatically open and close a lid of an at least one chamber for dispensing an algaecide material upon detection of the harmful algal blooms in the water body; and
- transmitting, by the controller, data related to the real-time images or videos, and real-time status update data to one or more user device through the server via the network.

13. The method for monitoring and improving water quality by mitigating harmful algal blooms of claim 12, wherein the artificial intelligence module is trained using reference data as training data to detect the harmful algal blooms from the captured images or videos, thereby accurately detecting the harmful algal blooms.

14. The method for monitoring and improving water quality by mitigating harmful algal blooms of claim 12, wherein the at least one capturing unit comprises at least one of multispectral cameras, hyperspectral cameras and artificial Intelligence (AI) cameras.

15. The method for monitoring and improving water quality by mitigating harmful algal blooms of claim 12, wherein the server comprises an artificial intelligence (AI) deep learning model, wherein the AI deep learning model is trained using reference data as training data to detect the harmful algal blooms from the captured images or videos, thereby accurately detecting the harmful algal blooms.

16. The method for monitoring and improving water quality by mitigating harmful algal blooms of claim 12, wherein the automatic detection unit comprises at least one power source to supply electric power for performing the multiple operations.

17. The method for monitoring and improving water quality by mitigating harmful algal blooms of claim 12, wherein the actuator is operatively connected to a rotatable arm, wherein the rotatable arm is configured to rotate to move the lid of the at least one chamber, thereby facilitating to dispense the algaecide material from the at least one chamber into the water body.

18. The method for monitoring and improving water quality by mitigating harmful algal blooms of claim 12, wherein the automatic detection unit is in communication with one or more user devices through the server via the network.

19. The method for monitoring and improving water quality by mitigating harmful algal blooms of claim 18, wherein the each user device is configured to enable a user to access data related to at least one of live image feeds, prediction statuses, and mitigation actions received from the automatic detection unit in real time through a user interface via a software application installed on the user device, wherein the software application comprises at least one of a web application and a mobile application.

20. The method for monitoring and improving water quality by mitigating harmful algal blooms of claim 12, wherein the network includes a communication protocol comprises at least one of Bluetooth, wireless local area network (WLAN), transmission control protocol/internet protocol (TCP/IP), wireless fidelity (Wi-Fi), global system for mobile communications (GSM), code division multiple access (CDMA), or a combination of both wireless and wired technologies.

* * * * *